Nov. 22, 1955   A. O. WURGLER, JR   2,724,432
TIRE BEAD AND RIM SEPARATING TOOL
Filed March 23, 1953   2 Sheets-Sheet 1
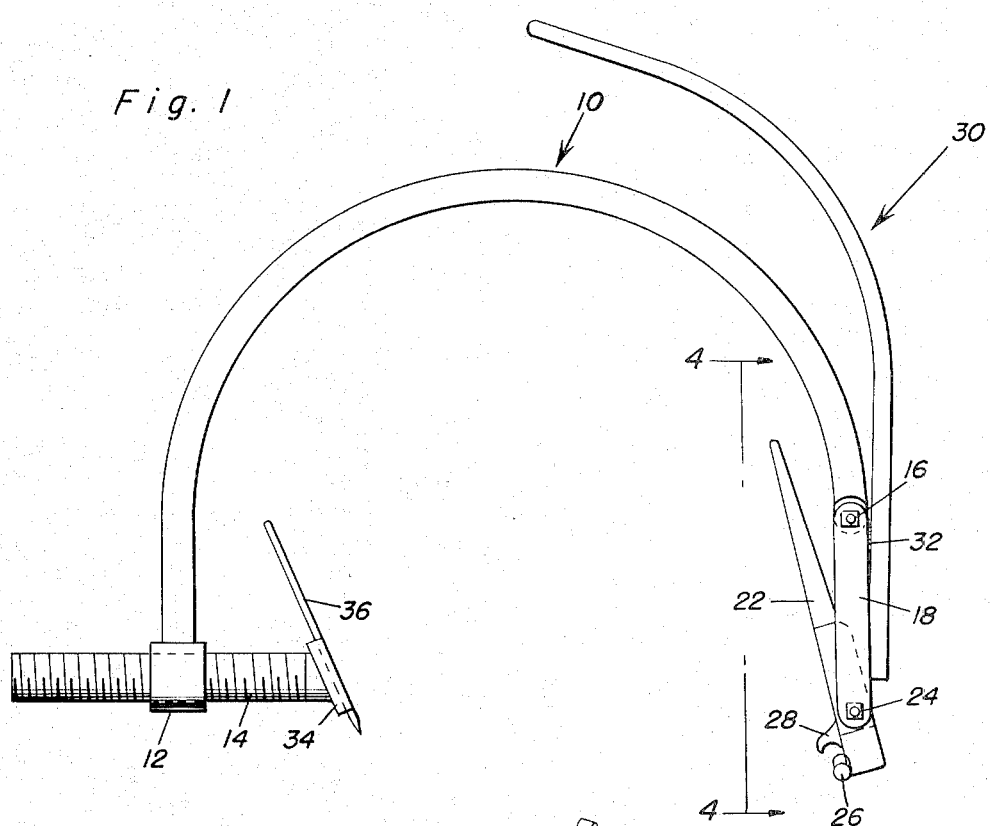
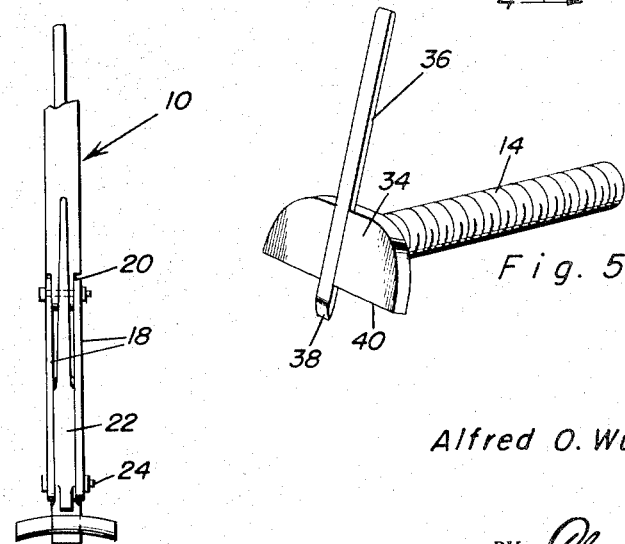
Alfred O. Wurgler, Jr.
INVENTOR.

Nov. 22, 1955          A. O. WURGLER, JR          2,724,432
                TIRE BEAD AND RIM SEPARATING TOOL
Filed March 23, 1953                          2 Sheets-Sheet 2
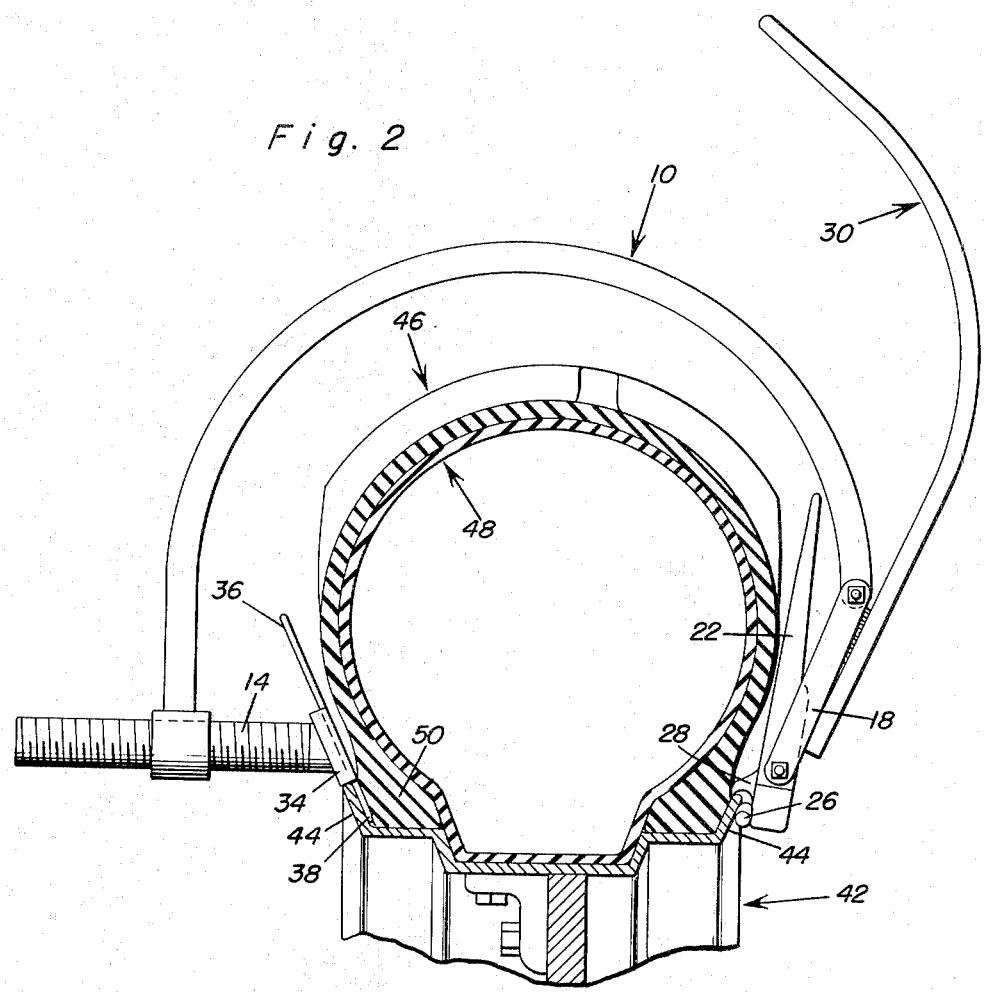
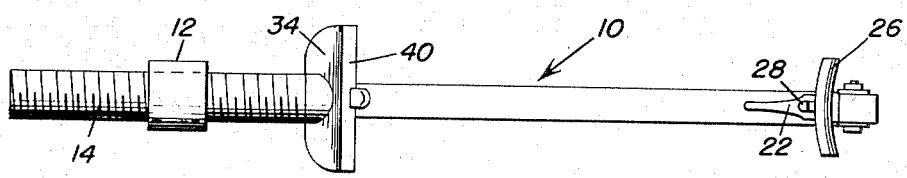
Alfred O. Wurgler, Jr.
INVENTOR.

United States Patent Office 2,724,432
Patented Nov. 22, 1955

2,724,432

TIRE BEAD AND RIM SEPARATING TOOL

Alfred O. Wurgler, Jr., Knox, N. Dak.

Application March 23, 1953, Serial No. 344,159

3 Claims. (Cl. 157—1.26)

This invention relates generally to tire tools and pertains more particularly to a bead and rim separating tool of improved construction which will facilitate the removal of a tire casing from its wheel.

Another object of this invention is to provide a tire tool constructed in such a manner as to allow tire casings to be removed from the wheel assemblies on vehicles with exposed tires, such as tractors, and the like, without removing the wheel assembly from the vehicle.

Another object of this invention is to provide a tire tool which includes a foot portion and having a bead engaging finger projectable therefrom to engage between the rim and the bead of a tire and wheel assembly.

Another object of this invention is to provide an improved tire tool which is provided with means for engaging the tire bead and the wheel rim on opposite sides of the wheel and tire assembly and in which means are provided for urging the member engaging the tire bead toward the opposite rim.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the novel tire tool showing details of its construction;

Figure 2 is a transverse section taken substantially through a wheel and tire assembly and showing the tool positioned thereon in the initial position of operation;

Figure 3 is a bottom plan view of the tool showing the relation between various of its parts;

Figure 4 is a vertical elevation of a portion of a tire tool taken substantially along the plane of section line 4—4 of Figure 1; and Figure 5 is a perspective view of the adjustable bead engaging foot assembly.

Referring now more particularly to Figure 1, reference numeral 10 indicates generally the main frame of the tool which is arcuate in configuration and may be rectangular in cross-section if desired, and one end of the frame terminates in an enlarged internally threaded boss 12 through which an adjusting stud 14 is engaged. The opposite end of the frame pivotally carries, as by bolt 16, one end of a pair of spaced links 18, the frame end terminating in a reduced portion 20 for this purpose. The other end of the links embraces an intermediate portion of an arm 22 received therebetween and pivotally secured thereto by the pivot bolt 24. Arcuate rod 26 and hook 28 are secured to the lower free end of the arm in vertically spaced relation presenting an opening between which the flared rim of a wheel is received, as will be presently apparent. The lower end of a hand lever 30 is welded, as at 32, to the links 18 and the hand lever extends upwardly therefrom in a curving manner to overlie the arcuate frame.

With further reference to Figure 5, it will be seen that the previously described adjusting stud 14 carries at its inner end a shoe plate 34 whose free face is provided with a slot slidably receiving a bead engaging finger 36, the tapered end 38 of which is projectable below the lower edge 40 of the plate for a purpose presently apparent.

With more particular reference now to Figure 2, reference numeral 42 indicates generally the wheel assembly of a tractor or other similar vehicles whose tires are uncovered and reference numeral 44 indicates the flared rim of the wheel. The usual tire 46 and inner tube 48 are shown in conventionally mounted relation on the wheel.

In operation, the adjusting stud 14 is manipulated so that the shoe 34 and arm 22 are positioned approximately to correspond to the width of the tire. The arcuate rod and the hook 28 are positioned to receive the flared portion of one side of the wheel rim while the shoe 34 is engaged in abutting relation to the tire casing at the other side of the wheel rim. Initially, the tire bead engaging finger may be adjusted within the plate 34 to permit the ready rotation of plate 34 so that it may be adjusted to conform to the size of the tire on which the device is being used. Hook 28 and rod 26 are engaged in a given tire rim portion by manipulating lever 22, after which the bead engaging finger 36 is pushed between the tire bead 50 and the rim 44 in the position shown in Figure 2. The hand lever 30 is then manipulated away from the frame 10 to exert sufficient force on the bead 50 to separate it from its rim whereupon the tool may be reversed to disengage the opposite bead from its rim. In this manner, due to the fact that the handle assembly projects entirely above the tool frame, the operator may manipulate the tool when in an upright position and it will be manifest that the tires of wheel assemblies of vehicles whose tires are not enclosed can be manipulated by this tool in such a manner as to allow the bead to be broken away from the rim and the tire removed from the wheel without necessitating the removal from the wheel and tire assembly from the vehicle.

Due to the fact that the upper portion of the arm 22 engages against the side wall of the tire casing and due to the fact that the bead engaging finger is positioned in engagement with the bead, a most efficient breaking action will take place during manipulation of the tool. The arcuate bar 26 and hook 28 assure positive engagement with the wheel rim at all times during manipulation of the tool which will tend to prevent slippage of the tool on the tire surface and will effect a positive engagement between the component parts of the tool with the tire to most effectively exert the desired tire bead and rim separating force.

From the foregoing, the construction and operation of the device will be readily understood and further explanation is believed to be unnecessary. However, since numerous modification and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tire rim and bead separating tool comprising a frame member of arcuate configuration including opposed end portions for substantially overlying the tread and oppositely disposed side wall and tire bead portions of an assembled tire and rim, said frame including on one end portion a horizontally disposed threaded boss adjustably supporting a stud member which includes a tire bead engaging portion at one end for engaging the tire bead and rim below said frame member, a link element pivoted at one of its ends to the other end of the frame member, said link element being pivotally connected at its other end to an intermediately pivoted manipulable arm including a tire rim engaging portion for providing a fulcrum for the tool at a point oppositely disposed to the tire bead engaging portion of said stud member, and a manipulable force transmitting lever secured to an intermediate portion of said link element for urging the tire bead from the tire rim at a point oppositely disposed to the fulcrum point of said tool.

2. A tire rim and bead separating tool as set forth in claim 1 wherein said tire rim engaging portion of said arm includes a downwardly directed hook for engaging an outer edge of said rim, said hook overlying a transverse rod for contacting a side portion of the rim below the outer edge thereof.

3. A tire rim and bead separating tool as set forth in claim 2 wherein the tire bead and rim engaging portion at one end of said stud includes a plate member having a transverse slot and a reciprocably supported bead engaging finger having a lower tapered end portion.

References Cited in the file of this patent

UNITED STATES PATENTS

| | | |
|---|---|---|
| 1,319,617 | Reininger | Oct. 21, 1919 |
| 1,439,381 | Safstrom | Dec. 19, 1922 |
| 1,952,453 | Mueller | Mar. 27, 1934 |
| 2,404,583 | McCollister | July 23, 1946 |
| 2,481,764 | Luton | Sept. 13, 1949 |
| 2,492,329 | Smith | Dec. 27, 1949 |
| 2,498,075 | Fishback | Feb. 21, 1950 |
| 2,513,756 | Smyser | July 4, 1950 |
| 2,579,868 | Schmid | Dec. 25, 1951 |
| 2,582,869 | Honeycutt | Jan. 15, 1952 |
| 2,621,715 | Lien et al. | Dec. 16, 1952 |
| 2,628,669 | Stubler | Feb. 17, 1953 |